US008202077B2

(12) United States Patent
Major

(10) Patent No.: US 8,202,077 B2
(45) Date of Patent: Jun. 19, 2012

(54) THERMO COMPACTOR

(76) Inventor: William C. Major, Lakeland, FL (US)

( * ) Notice: Subject to any disclaimer, the term of this patent is extended or adjusted under 35 U.S.C. 154(b) by 0 days.

(21) Appl. No.: 12/419,452

(22) Filed: Apr. 7, 2009

(65) Prior Publication Data

US 2010/0239704 A1    Sep. 23, 2010

Related U.S. Application Data

(60) Provisional application No. 61/125,627, filed on Apr. 28, 2008.

(51) Int. Cl.
*B29C 35/02* (2006.01)

(52) U.S. Cl. .............. 425/447; 425/126.1; 425/219; 425/221; 425/258; 425/384; 264/321; 222/146.2

(58) Field of Classification Search .......... 425/4 R, 425/73, 89, 144, 223, 224, 445, 817 R, 121, 425/122, 126, 218, 219, 221, 256, 258, 276, 425/277, 378.1, 383, 384, 447, 448; 264/321, 264/37, DIG. 69, 37.1, 37.26; 222/146.2, 222/146.5

See application file for complete search history.

(56) References Cited

U.S. PATENT DOCUMENTS

| | | | | |
|---|---|---|---|---|
| 3,551,166 A * | 12/1970 | Jurgen et al. | ............ | 426/98 |
| 3,639,551 A * | 2/1972 | Leach | ............ | 264/55 |
| 4,014,462 A * | 3/1977 | Robertson | ............ | 222/136 |
| 4,308,447 A * | 12/1981 | Notzold et al. | ............ | 219/421 |
| 4,344,579 A * | 8/1982 | Morita et al. | ............ | 241/34 |
| 4,706,560 A * | 11/1987 | Capodicasa | ............ | 100/102 |
| 4,717,809 A * | 1/1988 | Schwizer | ............ | 219/438 |
| 4,821,922 A * | 4/1989 | Miller et al. | ............ | 222/77 |
| 4,919,308 A * | 4/1990 | Majkrzak | ............ | 222/146.5 |
| 5,565,164 A * | 10/1996 | Goehner et al. | ............ | 264/321 |
| 5,645,862 A * | 7/1997 | Sable et al. | ............ | 425/73 |
| 5,650,083 A * | 7/1997 | Bondeson et al. | ............ | 219/421 |
| 5,657,904 A * | 8/1997 | Frates et al. | ............ | 222/146.5 |
| 5,662,243 A * | 9/1997 | Bondeson et al. | ............ | 222/1 |
| 5,667,746 A * | 9/1997 | Goehner et al. | ............ | 264/321 |
| 5,744,351 A * | 4/1998 | Bryan-Brown | ............ | 435/290.2 |
| 5,814,790 A * | 9/1998 | Bondeson et al. | ............ | 219/421 |
| 5,866,085 A * | 2/1999 | Yelvington | ............ | 422/307 |
| 6,033,606 A * | 3/2000 | Garza | ............ | 264/36.1 |
| 6,761,548 B1 * | 7/2004 | Snop | ............ | 425/3 |

* cited by examiner

*Primary Examiner* — Joseph Del Sole
*Assistant Examiner* — Seyed Masoud Malekzadeh
(74) *Attorney, Agent, or Firm* — Cian G. O'Brien, Esq.; Robert L. Wolter, Esq.; Beusse Wolter Sanks Mora & Maire, P.A.

(57) ABSTRACT

A Styrofoam densification machine for melting used Expanded Polystyrene (Styrofoam) products. It includes a hopper for holding the disposed Styrofoam and a hopper discharge area for melting the used Styrofoam. The Hopper discharge area contains a heated tray compartment which holds a receiving tray for collection of melted Styrofoam. The compartment shall have two or less access area doors for the retrieval of the collection tray. The discharge and compartment tray areas have silicone heating pads on the outside of the panels for heat. The hopper is surrounded by a paneled cabinet which includes up to two inches of installation. The machine is loaded by way of mechanical hopper lid(s) which includes up to two lid panels, high temperature seals, hinges and handles for ease of opening. The machine sits on up to four (4) casters along with anchoring plates. The machine operates on 120 volts, 208 volts and 240 volts.

18 Claims, 2 Drawing Sheets

THERMO COMPACTOR

CROSS-REFERENCE TO RELATED APPLICATIONS

This application claims the benefit of U.S. Provisional Application No. 61/125,627 filed Apr. 28, 2008, and incorporated herein by reference in its entirety.

BACKGROUND OF THE INVENTION

This invention relates to the densification (melting) of Expanded Polystyrene (EPS) also known as Styrofoam. The present invention relates particularly to the densification of used Styrofoam products through conductive heat and melting it into a block form to be used later in its recycling.

Styrofoam products are widely used in the food service industry such as cafeteria's and lunch rooms for storing and serving food and drink. Despite the suitability of Styrofoam for these purposes, the cost of its disposal along with the environmental impact it has on our natural resources, many are faced with finding alternative methods for its disposal.

Presently, in the cafeteria/lunchroom settings where they serve on Styrofoam trays, it is customary to dispose of the tray by either dumping the tray along with the remaining food left on the tray into a garbage bag and dispose of all its contents. Others remove any food that is left on the tray into one garbage bag and stack and fill another bag with the trays, and in the process reduce their bag usage and freeing-up more dumpster space allowing for less pick-ups of the dumpster.

In recent years numerous companies in the plastic recycling industry have developed machines for the purpose of densifying Styrofoam products through hydraulic and pneumatic compression, heat transfer and chemical processes. These machines are usually used at large industrial settings along with strict processing requirements such as shredding, cleaning and filtering of the Styrofoam prior to densifying.

The present invention is directed to overcoming one or more of the problems set forth above.

DESCRIPTION OF THE INVENTION

The Thermo Compactor is a specially designed machine for melting Polystyrene EPS (Styrofoam) in a clean or food contaminated state. The melting point of EPS is such that any contaminated EPS when melted with food particles such as found in lunch room settings are odor free and encapsulated into the melted plastic. The hopper frame and cabinet are made out of aluminum with insulation for heat retention. The heat for melting the Styrofoam material is derived from silicone heat blankets that are positioned in specific areas on the four trapezoidal sides of the lower hopper for correct heat transfer. The discharge area at the bottom of the hopper is encompassed by a Heated Tray Compartment which has heat blankets attached to each of its sides including the bottom plate. The heat produced from the Heat Draft Compartment allows for complete discharge of the melted plastic. Without the Heated Tray Compartment the melted plastic would cool too quickly and not drip into the holding tray. The holding tray is designed and positioned inside of the Heat Draft Compartment to catch all the melted plastic. The design of the holding tray is of a trapezoidal shape which allows for easy emptying.

Operation:

The operation of the machine is simple and restricted to loading the Styrofoam waste material into the top of either of the hopper lids and closing the hopper lid, switching the Thermo Compactor on/off and then removing the melted Styrofoam once it has cooled in the tray.

Figure 1:
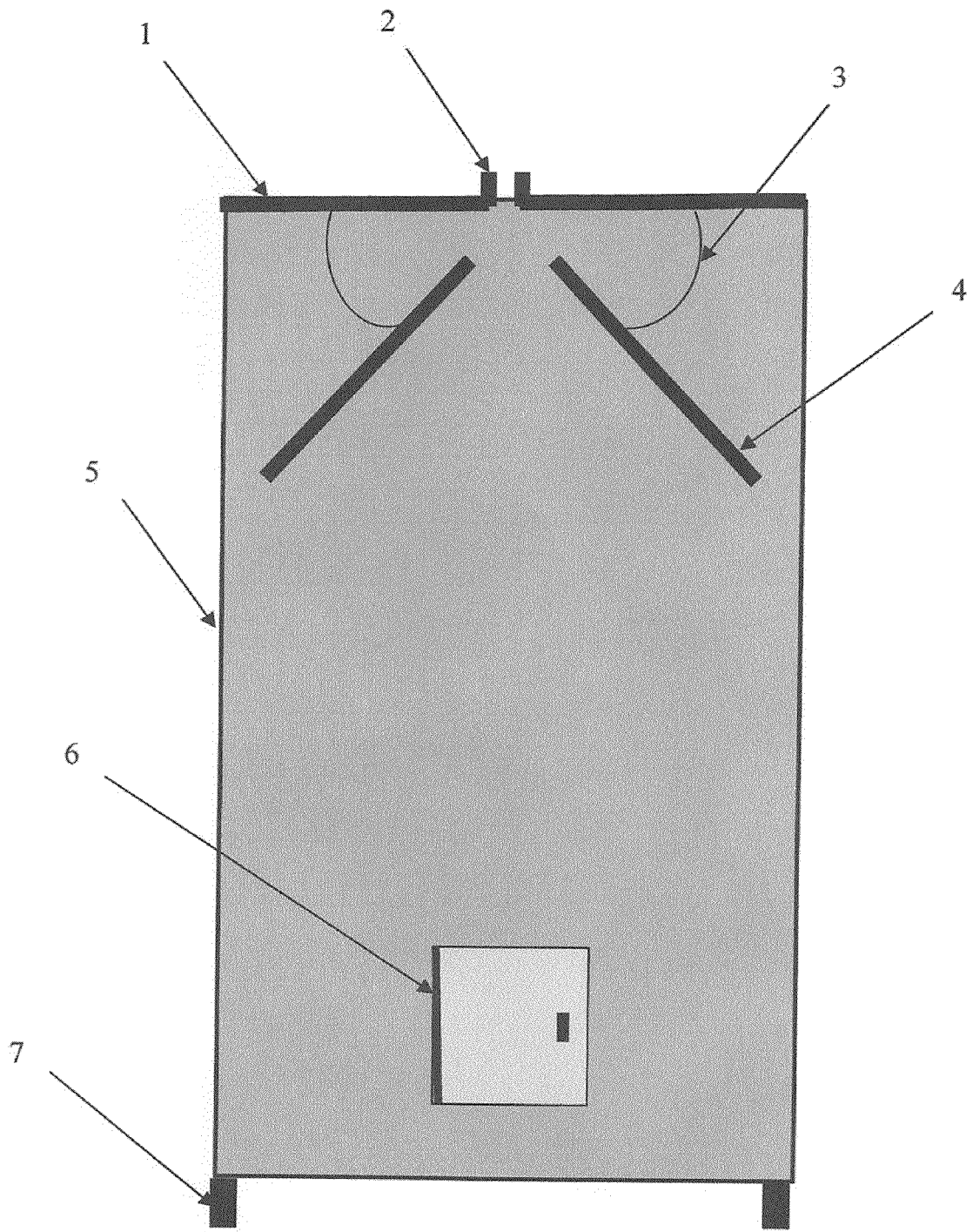
FIG. 1 is a diagrammatic view, partially in section, of the outside cabinet assembly incorporating the subject invention consisting of:
1. Hopper Lid(s) assembly
2. Hopper Lid(s) rotating shaft
3. Hopper Lid(s) handle bracket
4. Hopper Lid(s) handles
5. Hopper cabinet panels
6. Hopper tray compartment door(s)
7. Hopper cabinet casters
Figure 2:
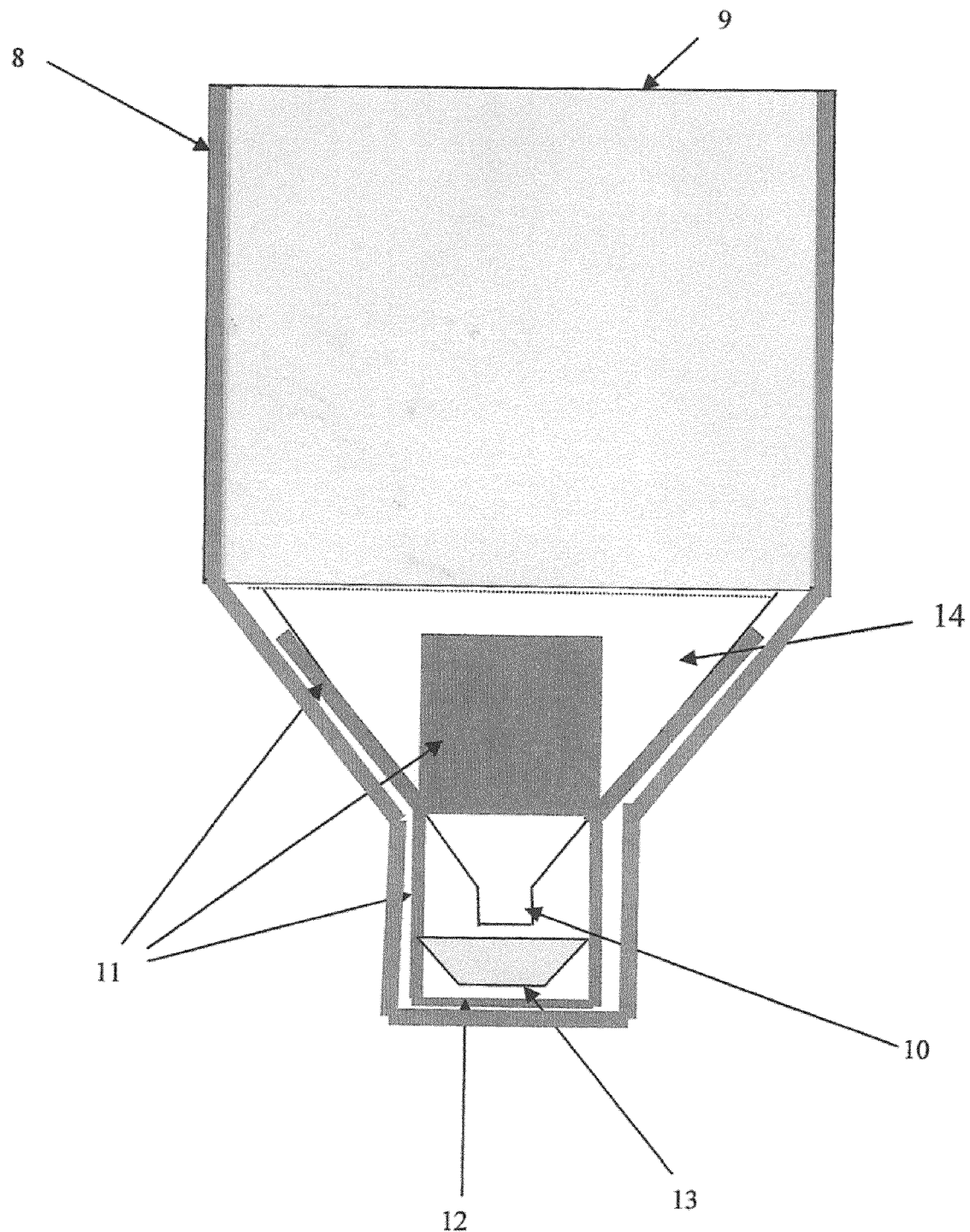
FIG. 2 is a diagrammatic view, partially in section, of the inside upper and lower hopper assemblies incorporating the subject invention consisting of:
8. Insulation surrounding upper hopper and lower hopper assemblies
9. Upper hopper assembly
10. Lower hopper discharge area
11. Silicone heating pads
12. Lower hopper tray compartment
13. Tray compartment collection tray
14. Lower hopper

I claim:

1. A machine for melting and densifying waste items composed of expanded polystyrene through heat transfer, the machine comprising:
    a hopper for loading used expanded polystyrene material that includes a heated discharge section for heating and melting expanded polystyrene along with a heated tray compartment for collected melted expanded polystyrene;
    wherein the hopper includes one or more substantially vertically disposed insulated walls that are configured to form an interior volume;
    an upper hopper loading area within the hopper towards a top end of the hopper walls;
    a lower hopper section within the hopper and below the upper hopper loading area, and including one or more inclined panels disposed and supported within the hopper having a top end thereof adjacent to the upper hopper loading area;
    wherein the discharge section is connected to a bottom end of the lower hopper section; and
    the tray compartment is disposed within the hopper and includes one or more substantially vertically disposed panels spaced inward of the one or more hopper walls and connected to the inclined panels of the lower hopper section and configured to form an interior space within which the discharge section is disposed;
    heating pads affixed to outer surfaces of the one or more lower hopper section and tray compartment panels for heating the lower hopper section, tray compartment and/or discharge section to temperatures sufficient to melt the expanded polystyrene;

a tray disposed within the tray compartment below the discharge section for collecting melted expanded polystyrene;

one or more hopper lids operatively connected to hopper walls at the upper hopper loading area to open and close the hopper for loading used expanded polystyrene into the upper hopper loading area.

2. The machine as set forth in claim 1, wherein said lower heated hopper and heated tray compartment are heated to temperatures of up to 450° F. through heat transfer that allows for densification and/or melting of expanded polystyrene material.

3. The machine as set forth in claim 1, wherein said collection tray that allows for collecting densified/melted expanded polystyrene material, wherein the tray is a four sided tray whereas two short sides are trapezoid shaped and two long sides are flat panels, and wherein all sides are attached and form a tray that is a trapezoid cavity that when filled with densified/melted expanded polystyrene material it produces an expanded polystyrene block.

4. The machine as set forth in claim 1, wherein said one or more mechanical hopper lids are a two piece lid-system that allows for loading the machine from either the right side or left, wherein the lid system is hinged at the center.

5. The machine as set forth in claim 4, wherein the mechanical hopper lid system is a two part system whereas each lid is opened and operated independently of each other, and each lid is hinged and attached to its own shaft and handle and when rotated in the upward direction, opens lid(s) for loading of expanded polystyrene material.

6. The machine as set forth in claim 1, wherein the said machine operates off of a wattage of 1800 or less, an amperage of 15 or less, a voltage of 115/120, single phase, 60 hertz.

7. The machine as set forth in claim 1, wherein the one or more hopper walls are configured such that the hopper has a rectangular cross-sectional configuration and the hopper includes two insulated end walls and two insulated side walls, wherein the lid is operatively connected to a top of the hopper to open and close the upper hopper area.

8. The machine as set forth in claim 7, wherein the one or more inclined panels of the lower hopper section include two panels that each extends from one end wall of the hopper to the other end wall.

9. A machine for melting and densifying waste items composed of expanded polystyrene, the machine comprising:
a plurality of insulated walls connected to one another forming in internal volume within which a hopper is supported, the hopper comprising:
an upper hopper loading area disposed toward a top end of the walls, within which the waste items are placed;
a lower hopper section below the upper loading area including at least two inclined panels; and,
a discharge section below the lower hopper section having an opening through which melted expanded polystyrene is deposited;
a collection compartment disposed within the internal volume of the machine walls and below the discharge section within which the melted expanded polystyrene is collected, wherein the collection compartment comprises at least two substantially vertically disposed panels which are approximately parallel and spaced apart and connected to the lower hopper section forming a space therebetween within which the discharge section is disposed; and,
a plurality of heating pads affixed to outer surfaces of the panels for the lower hopper section and the collection compartment to generate a sufficient heat within the lower hopper section, discharge section and/or collection compartment to melt the expanded polystyrene.

10. The machine of claim 9, further comprising a removable tray disposed within the collection compartment and positioned below the opening of the discharge section for collecting the melted expanded polystyrene.

11. A machine for melting and densifying waste items composed of expanded polystyrene through heat transfer, the machine comprising:
a hopper for loading used expanded polystyrene material, said hopper including;
an upper hopper loading area including one or more substantially vertically disposed insulated walls that are configured to form an upper interior volume,
a lower hopper section below the upper hopper loading area and including one or more inclined panels that are configured to form a lower interior volume,
a discharge section connected to a bottom end of the inclined panels of the lower hopper section, said discharge section including a tray compartment including one or more substantially vertically disposed panels spaced inward of the substantially vertically disposed insulated walls of the upper hopper loading area and connected to the bottom end of the inclined panels of the lower hopper section,
heating pads affixed to outer surfaces of one or more of the inclined panels of the lower hopper section and one or more of the substantially vertically disposed panels of the tray compartment for heating the lower hopper section, the tray compartment and/or discharge section to temperatures sufficient to melt the expanded polystyrene, and
a tray disposed within the tray compartment below the discharge section for collecting melted expanded polystyrene.

12. The machine of claim 11, wherein the heating pads include:
heating pads affixed to the outer surface of the inclined panels of the lower hopper section; and
substantially vertically disposed heating pads affixed to the outer surface of the substantially vertically disposed panels of the tray compartment.

13. The machine of claim 11, wherein said hopper further comprises:
one or more inclined insulated walls, wherein a top end of the one or more inclined insulated walls is connected to a bottom end of the one or more substantially vertically disposed insulated walls of the upper loading area, and wherein said one or more inclined insulated walls are configured to at least enclose the lower interior volume.

14. The machine of claim 13, wherein the one or more inclined insulated walls are oriented substantially parallel to the one or more inclined panels of the lower hopper section.

15. The machine of claim 13, wherein said hopper further comprises:
one or more substantially vertically disposed insulated walls configured to at least enclose the discharge section, wherein a top end of the one or more substantially vertically disposed insulated walls is connected to a bottom end of the one or more inclined insulated walls.

16. The machine of claim 15, wherein the one or more substantially vertically disposed insulated walls configured to enclose the discharge section are oriented substantially parallel to the one or more substantially vertically disposed panels of the tray compartment.

17. The machine of claim 13, wherein the heating pads include heating pads affixed to the outer surface of the inclined panels of the lower hopper section;

and wherein the heating pads are affixed to the outer surface of the inclined panels such that the heating pads are substantially parallel to the one or more inclined insulated walls.

18. The machine of claim 15, wherein the heating pads include substantially vertically disposed heating pads affixed to the outer surface of the substantially vertically disposed panels of the tray compartment;

and wherein the substantially vertically disposed heating pads are affixed to the outer surface of the substantially vertically disposed panels such that the substantially vertically disposed heating pads are substantially parallel to the one or more substantially vertically disposed insulated walls which at least enclose the discharge section.

* * * * *